(12) United States Patent
Hjelm et al.

(10) Patent No.: US 9,805,111 B2
(45) Date of Patent: Oct. 31, 2017

(54) DATA MODEL PATTERN UPDATING IN A DATA COLLECTING SYSTEM

(75) Inventors: Johan Hjelm, Tokyo (JP); Mattias Lidstrom, Stockholm (SE); Mona Matti, Nacka (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 577 days.

(21) Appl. No.: 13/877,576

(22) PCT Filed: Oct. 4, 2010

(86) PCT No.: PCT/SE2010/051068
§ 371 (c)(1),
(2), (4) Date: Apr. 3, 2013

(87) PCT Pub. No.: WO2012/047138
PCT Pub. Date: Apr. 12, 2012

(65) Prior Publication Data
US 2013/0311468 A1 Nov. 21, 2013

(51) Int. Cl.
*G06Q 10/00* (2012.01)
*G06F 17/30* (2006.01)
(Continued)

(52) U.S. Cl.
CPC .. *G06F 17/30598* (2013.01); *G06F 17/30539* (2013.01); *G06Q 10/06* (2013.01); *G06Q 30/02* (2013.01)

(58) Field of Classification Search
CPC ..................... G06F 17/00; G06Q 10/00–30/00
(Continued)

(56) References Cited

U.S. PATENT DOCUMENTS 4,882,756 A * 11/1989 Watari .................... G10L 15/12
704/241
5,615,341 A * 3/1997 Agrawal et al. ............. 705/7.29
(Continued)

FOREIGN PATENT DOCUMENTS

WO 2008011728 A1 1/2008

OTHER PUBLICATIONS

Sugiyama, Kazunari, Kenji Hatano, and Masatoshi Yoshikawa. "Adaptive web search based on user profile constructed without any effort from users." Proceedings of the 13th international conference on World Wide Web. ACM, 2004.*
(Continued)

*Primary Examiner* — Alan S Miller
(74) *Attorney, Agent, or Firm* — Patents on Demand; Brian K. Buchheit

(57) ABSTRACT

A pattern analysing device (27) in a pattern processing node {21} of a data collection system (10) comprises a pattern updating unit equipped with a pattern collecting element configured to obtain an existing pattern of historical data according to at least one existing data model, where the existing pattern relates to an entity (11) associated with the data collection system and obtain a further pattern of newer data according to a further data model, where the further pattern also relates to the entity, <<pattern updating element configured to compare the patterns with each other, determine if the existing data model can be mapped on the further data model and update the existing pattern with the further pattern in relation to the historical data if the existing data model can be mapped on the further data model.

15 Claims, 4 Drawing Sheets

(51) Int. Cl.
*G06Q 10/06* (2012.01)
*G06Q 30/02* (2012.01)

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,035,057 | A * | 3/2000 | Hoffman | 382/159 |
| 6,473,757 | B1 * | 10/2002 | Garofalakis et al. | |
| 7,007,020 | B1 * | 2/2006 | Chen et al. | 705/7.29 |
| 7,162,522 | B2 * | 1/2007 | Adar | G06F 17/30861 707/999.006 |
| 7,379,937 | B2 * | 5/2008 | Inokuchi | |
| 7,433,879 | B1 * | 10/2008 | Sharma et al. | |
| 7,503,071 | B1 * | 3/2009 | Hernacki | H04L 41/142 370/241 |
| 7,548,915 | B2 * | 6/2009 | Ramer | G06F 17/30867 705/14.54 |
| 7,636,698 | B2 * | 12/2009 | Crivat | G06F 17/30592 706/21 |
| 7,853,081 | B2 * | 12/2010 | Thint | 382/181 |
| 7,996,404 | B2 * | 8/2011 | Wong et al. | 707/737 |
| 2002/0091680 | A1 * | 7/2002 | Hatzis et al. | 707/3 |
| 2003/0023591 | A1 * | 1/2003 | Ma et al. | 707/6 |
| 2003/0105658 | A1 * | 6/2003 | Chen et al. | 705/10 |
| 2003/0214775 | A1 * | 11/2003 | Fukuta et al. | 361/220 |
| 2004/0249866 | A1 * | 12/2004 | Chen et al. | 707/200 |
| 2007/0094042 | A1 * | 4/2007 | Ramer et al. | 705/1 |
| 2007/0219990 | A1 * | 9/2007 | Crivat et al. | 707/6 |
| 2009/0150321 | A1 * | 6/2009 | Ning et al. | 706/48 |
| 2010/0010985 | A1 * | 1/2010 | Wong et al. | 707/5 |
| 2011/0264663 | A1 * | 10/2011 | Verkasalo | 707/740 |
| 2012/0084248 | A1 * | 4/2012 | Gavrilescu | 706/52 |

OTHER PUBLICATIONS

Imielinski, Tomasz, and B. R. Badrinath. "Mobile wireless computing: Challenges in data management." Communications of the ACM 37.10 (1994): 18-28.*

Montaner, Miguel, Beatriz López, and Josep Lluis De La Rosa. "A taxonomy of recommender agents on the internet." Artificial intelligence review 19.4 (2003): 285-330.*

Gao "Constructing User Behavioral Profiles Using Data-Mining-Based Approach" dated 2005; Internet URL: http://arizona.openrepsoitory.eom/arizona/bitstream/10150/195843/1/ azu_etd_1261_sip1_m.pdf; all pages.*

Ahmad Wasfi, Ahmad M. "Collecting user access patterns for building user profiles and collaborative filtering." Proceedings of the 4th international conference on Intelligent user interfaces. ACM, 1998.*

* cited by examiner

1

DATA MODEL PATTERN UPDATING IN A DATA COLLECTING SYSTEM

CROSS-REFERENCE TO RELATED APPLICATION

This application is a 35 U.S.C. §371 National Phase Entry Application from PCT/SE2010/051068, filed Oct. 4, 2010, and designating the United States.

TECHNICAL FIELD

The invention, generally relates to identifying patterns in data in a data collection system. More particularly, the invention relates to a method, pattern analysing device computer program and computer program product for changing a pattern in data according to at least one data model.

BACKGROUND

User profiles are of interest in various situations in order to obtain information about various types of consumer behaviour. It is for example of interest to obtain such profiles in relation to the shopping habits of a user in retail stores, like supermarkets.

Another area, where user profiles are of interest is in the field of communication, like for instance wireless communication. Here the user profile, for instance the way a user uses a communication network, is of interest for various reasons, such as billing and identifying services to be offered to the user, but also in relation to how the network can be managed and dimensioned.

The user profile is then typically determined based on data collected in the environment of the user. More particularly the user profile is typically based on patterns in the collected data. Based on a large amount of data it is then possible to obtain a pattern in the data using for instance machine learning. One or more such patterns are then used for obtaining a user profile. Examples on machine learning techniques include support vector machines and principal component analysis.

These types of techniques are useful when obtaining a user profile based on data. However if the data on which a profile is to be made changes over time, in that new data types are introduced, then the accuracy of older profiles that are based on older data is unreliable and the older profile may therefore be risky to use.

The present invention is directed towards allowing continued use of an existing profile.

SUMMARY

The invention is therefore directed towards allowing new data to influence a profile made on historic data.

One object of the invention is thus to allow new data to influence a profile made on historic data. This object is according to a first aspect of the invention achieved through a method for changing a pattern in data according to at least one data model, where the data is grouped in a data base according to entity and the method is performed in a pattern processing node of a data collection system. The method comprises the steps of obtaining an existing pattern, of historical data according to
   at least one existing data model, where the existing pattern
   relates to an entity associated with the data collection
   system,

2 obtaining a further pattern of newer data according to a
   further data model, where the further pattern also relates
   to the entity,
comparing the patterns with each other,
determining if the existing data model can foe mapped on
   the further data model based on the comparison, and
updating the existing pattern with the further pattern in
   relation to the historical data if the existing data model can
   be mapped on the farther data model.

This object is according to a second aspect of the invention achieved by a pattern analysing device in a pattern processing node of a data collection system comprising:
a pattern updating unit equipped with
   a pattern collecting element configured to obtain an
      existing pattern of historical data according to at least
      one existing data model, where the existing pattern
      relates to an entity associated with the data collection
      system, and
   obtain a further pattern of newer data according to a
      further data model, where the further pattern also
      relates to the entity, and
   a pattern updating element configured to determine if the
      existing data model can be mapped on the further data
      model based on the comparison, and
   update the existing pattern with the further pattern in
      relation to the historical, data if the existing data model
      can be mapped on the further data model.

This object is according to a third aspect of the invention also achieved through a computer program for changing a pattern in data according to at least one data model, where the data is grouped in a data base according to entity and the computer program comprises computer program code, which when run on a processor in a computer of a pattern processing node of a data collection system causes the computer to obtain an existing pattern of historical data according to at
   least one existing data model, where the existing pattern
   relates to an entity associated with the data collection
   system,
obtain a further pattern of newer data according to a further
   data model, where the further pattern also relates to the
   entity,
compare the patterns with each other,
determine if the existing data model can be mapped on the
   further data model based on the comparison, and
update the existing pattern with the further pattern in relation
   to the historical data if the existing data model can be
   mapped on the further data model.

A fourth aspect of the invention is directed towards a computer program product comprising a computer program according to the third aspect and a computer readable means on which the computer program is stored.

The invention according to these aspects has a number of advantages. The invention enables the possibility to include patterns in a profile of an entity, as the patterns become richer due to data models being richer. In this way it is possible to use existing data in combination with new data for obtaining of profiles, which may speed up the determining of a profile. A reliable profile can thus be obtained fast. There is also a more efficient use of data models as well as patterns.

According to one variation of the invention each pattern comprises a number of attributes.

According to this variation, the step of comparing patterns in the method comprises comparing attributes of the patterns with each other, where each attribute corresponds to data of a data model and the step of updating comprises adding attributes of the further pattern to the existing pattern.

According to this variation the pattern updating element when being configured to compare patterns is further configured to compare attributes of the patterns with each other, where each attribute corresponds to data, of a data model and when being configured to update patterns is further configured to add attributes of the further pattern to the existing pattern.

According to this variation the computer program code of the computer program and computer program product, is further configured to compare attributes of the patterns with each other when comparing patterns comprises, where each attribute corresponds to data of a data model and to add attributes of the further pattern to the existing pattern the when updating patterns.

According to another variation of the invention each pattern is provided as a vector.

According to this variation the step of comparing comprises determining the distance between the vectors and the step of determining if the existing data model can be mapped on the further data model comprises comparing the distance with a distance threshold.

According to this variation of the invention the pattern updating element when being configured to compare patterns is further configured to determine the distance between the vectors and to compare the distance with a distance threshold when determining if the existing data model can be mapped on the further data model.

According to the same variation of the invention, the computer program code of the computer program and computer program product causes the computer to determine the distance between the vectors when comparing patterns and to compare the distance with a distance threshold when determining if the existing data model can be mapped on the further data model.

According to yet further variations of the invention, the comparing of patterns is made while considering a set of polices. Here the set of policies may comprise an absolute policy regarding at least one attribute. The set of policies may also comprise an aggregate policy regarding at least one attribute.

In another variation of the invention, the step of comparing the existing pattern with the further pattern comprises comparing the occurrence of the further pattern in relation to the occurrence of the existing pattern in the newer data according to the further data model and the step of updating comprises updating the existing pattern with the further pattern with the same relationship as in the newer data.

In this variation of the invention the pattern updating element when being configured to compare patterns is further configured to compare the occurrence of the further pattern in relation to the occurrence of the existing pattern in the newer data according to the further data model and updating the existing pattern with the further pattern with the same relationship as in the newer data when updating the existing pattern.

In this variation of the invention the computer program code of the computer program and computer program product causes the computer to compare the occurrence of the further pattern in relation to the occurrence of the existing pattern in the newer data according to the further data model when comparing the existing pattern with the further pattern and to update the existing pattern with the further pattern with the same relationship as in the newer data when updating the existing pattern.

According to another variation of the invention, the method comprises the further step of identifying the further pattern based on at least some newer data.

According to this variation of the invention the pattern analysing device further comprises a pattern analysing unit configured to identify at least the further pattern based on at least some of the newer data.

According to the same variation of the invention, the computer program code of the computer program and computer program product causes the computer to identify at least the further pattern based on at least some of the newer data.

According to yet another variation of the invention, the method comprises the further the steps of determining the probability of data resulting in new patterns based on the further pattern and the data models, comparing the probabilities with a probability threshold and discarding data for which the probability fails below the threshold.

According to this variation of the invention the pattern analysing device may comprise a data discarder, which is configured to determine the probability of data resulting in new patterns based on the further pattern and the data models, compare the probabilities with a probability threshold and discard data for which the probability falls below the threshold.

According to the same variation of the invention, the computer program code of the computer program and computer program product causes the computer to determine the probability of data resulting in new patterns based on the further pattern and the data models, compare the probabilities with a probability threshold and discard data fax which the probability falls below the threshold.

According to yet another variation the existing pattern has a label.

In this variation the method comprises the further step of changing the label based on the updated pattern.

According to the same variation of the invention, the pattern updating element is further configured to change the label based on the updated pattern.

According to the same variation of the invention, the computer program code of the computer program and computer program product causes the computer to change the label based on the updated pattern.

An entity is in the context of the invention an entity associated with data readings or data and may be a user of the data collecting system, the user of a user terminal of the data collecting system as well as such a user terminal. The entity may thus be a machine. An entity may also be a group of such users or user terminal or some other entity in the system associated with data readings such as a building.

Historic data is here data associated with an existing pattern, i.e. data generated before an existing pattern has been identified. New data is intended to cover data generated after, i.e. later than, the historic data and therefore this new data has not been considered in the identification of the existing pattern.

A pattern related to an entity may be pattern in data generated by the entity. It may also be patterns in measurements of activities by the entity. It may furthermore be patterns in data made by a device associated with the entity or patterns in measurements of activities made by a device associated with, the entity, in the latter oases the entity may be the user of a data communication system and the device associated with the user may be a user terminal of this user.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
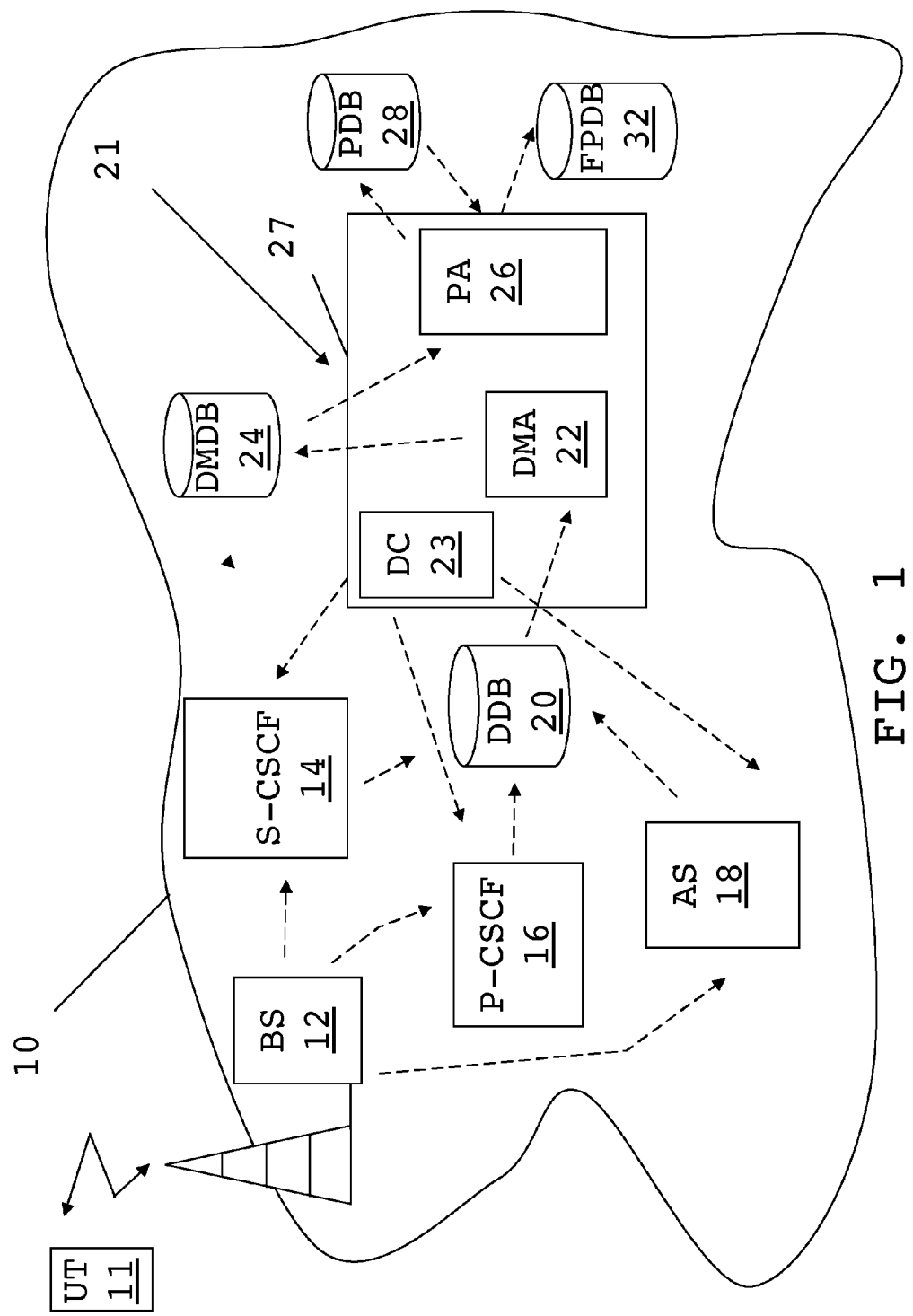
FIG. 1 schematically shows a user terminal communicating with a data collecting system in the form of a wireless communicating system.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards providing patterns in data in relation to an entity associated with a data collecting system. These patterns can be used for obtaining profiles of entities in the system, where the entities may be users. The data collecting system may here be a communication system and is here a wireless communication system. An entity for which patterns are obtained can be the user of such a system, such as the user of a user terminal like a cellular phone or a group of users of cellular phones. However, the entity can also foe an object such as the user terminal, or some other entity in the system associated with data readings such as a building in which, the system or a part of the system is provided. The system may also be another type of system than a communication system such as for instance a supermarket or a general, service provider where the patterns of entities are of interest to map.

In order to meet user demands hut also in order to better design communication networks and network bottlenecks as well as adjust services to the preferences of users, it is of interest to map the behaviour of entities such as users. This allows network operators of for instance telecommunication networks to know what type of communication is to be prioritised. Examples on prioritizing are short delay, which is important in voice communication, and high bandwidth, which is important in a lot of computer communication applications.

By mapping the behaviour or patterns of entities, it is then possible to make intelligent decisions concerning network design. It also allows a system operator to find out what types of services are in demand and at what times, which may also be off interest for marketing and advertising purposes.

Such patterns can be identified based on for instance machine learning algorithms and may be stored in data bases. However, the systems are not static. They are changed and so may also the services over time. This also means that the patterns of the entities are changing. Such new services and patterns can then also be stored, alongside the old patterns of previous behaviour. It would however be of interest to combine the learning of these different situations. It would therefore be of interest to take advantage of the behaviour of a user in relation to new services and apply them also on existing patterns of the previous behaviour. It is thus of interest to not just, discard the old historic patterns but take advantage of them in the new environment. The invention is directed to such a situation.

A first embodiment of the invention will now be described in more detail in the non-limiting example context of a communication system. A system 10 is shown in FIG. 1. The systemic may here be a cellular system such as a Universal Mobile Telecommunications System (UMTS) network or a Long Term Evolution (LTE) system. The system may with advantage be an IP Multimedia Subsystem (IMS) system.

To the system 10 there is connected a user terminal UT 11 being associated with a user. Here the user terminal may be a phone, such as a mobile phone or a computer like a lap top computer, tablet computer or a palm top computer. These are mere examples of user terminals that can be used together with the invention.

The user terminal 11 communicates with the system 10 using a network interface, which in the exemplifying embodiment is an aerial interface. This interface is here provided in the form of a base station BS 12, which in some network is also called an eNodeB. In the system 10 there is further a number of various nodes in charge of different aspects of communication. In the exemplifying system 10 there is a first communications server 14, here in the form of a Serving Call Session Control Function (S-CSCF) server, a second communication server 16, here in the form of a Proxy Call Session Control Function (P-CSCF) server and an application server (AS) 18. The call session control functions of the first and second communication servers 14 and 16 handle the connectivity aspects of the communication to the user terminal 11, while the application server 18 provides services via communication links handled by these communication servers 14 and 16. The application server 18 may as an example be a Multimedia Telephony (MMTEL) server or a Push-to-Talk Over Cellular (PoC) server. Here it should furthermore be mentioned that in the present example, the system nodes communicate using a communication protocol, which in this example is the Session Initiation Protocol (SIP). They therefore exchange SIP messages. It should here be realized that IMS and SIP are merely examples of some types of systems, messages and protocols that may be used. It is thus possible that other types of systems, messages and protocols may be used. Examples on other types of systems are Generic Access Network and Naked SIP and an example of another protocol is H.323. In the example of IMS, the system may furthermore include various protocol translation nodes for translating between IMS/SIP and protocols used by application servers. Examples on this is an IP Multimedia Service Switching Function (IM-SSF) server performing translation between IMS/SIP and CAMEL (Customised Applications for Mobile networks Enhanced Logic) as described in 3GFP TS 29.278, and also possibly between IMS/SIP and MAP (Mobile Application Part) as described in 3GPP TS 29.002. Another possible translation server is OSA Service Capability Server (OSA-SCS) for translating between IMS/SIP and OSA (Open Service Access) as described in 3GPP TS 29.198.

When handling communication and providing services, the various servers in the system 10 collect data of the activities of various entities, such as activities of the user terminal 11. Such data being collected by the servers, which may include measurements, is then stored, for instance in log files. The data can thereafter be fetched from the log files and stored in a data database DDB 20 according to various data models used. Data from various types of communication handling devices, in the system 10, like the above described servers 14, 16 and 18, may then be stored in this database 20.

In the system 10 there is also a pattern, processing node 21. In this node 21 patterns in the data associated with entities can then be identified and processed. The node 21 here includes a pattern analysing device 27, which may thus be provided through the computer or server. The pattern analysing device in turn comprises a data model analyser DMA 22 and a pattern analyser PA 26 as well as a data collector DC 23. The data collector 23 here controls storing of data, from various system nodes in the data database 20, where the first and second communication servers 14, 16 are two of these system nodes and the application server 18 is another system node. The data model analyser 22 furthermore accesses the data database 20 and a data model database DMDB 24, while the pattern analyser 26 accesses the data model database 24, a pattern database PDB 28 as well as a filtered pattern database FPDB 32.

Figure 8:
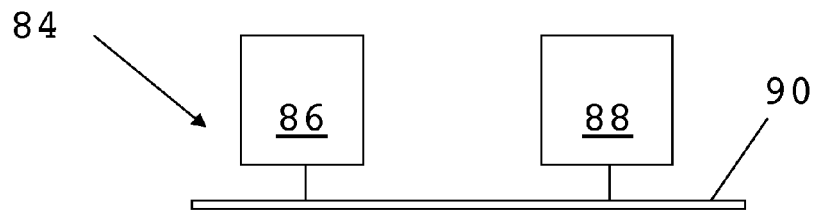

The pattern processing node may be implemented through a computer or server in the system 10. Such a computer 84 is schematically shown in FIG. 8. This computer 84 comprises a processor 86 and a program memory 88 connected to a bus 90, where the memory 88 would include software implementing the functionality of the pattern analysing device when being run by the processor. It should also be realized that the above mentioned processor may be a single central processing unit, but it can also be distributed and thus that the functionality of the data analysing device can be implemented via two or more different processor units in the computer 84. For example, the processor 86 may include general purpose microprocessors, instruction set processors and/or related chips sets and/or special purpose microprocessors such as ASICs (Application Specific Integrated Circuit). The processor may also comprise board memory for caching purposes.

Figure 2:
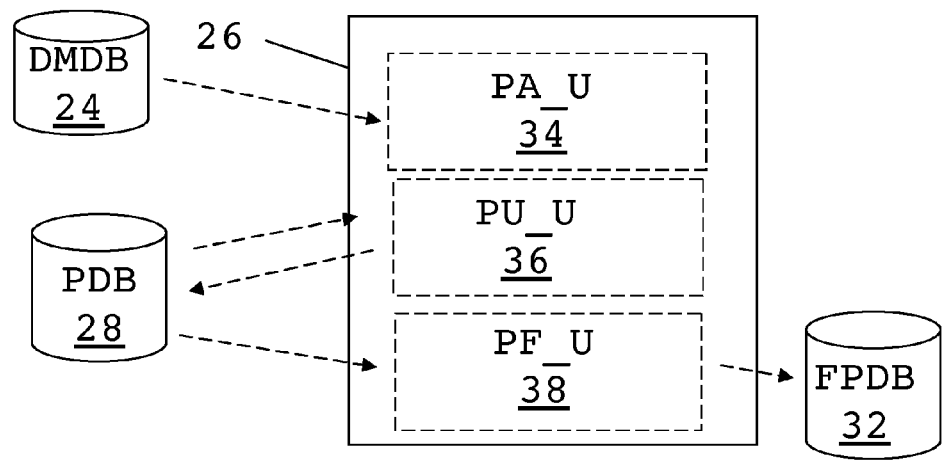
FIG. 2 shows a simplified block schematic of a pattern analyser in the data collection system.

FIG. 2 shows a block schematic of the pattern analyser 26 communicating with the data model data base 24, the pattern data base 28 and the filtered pattern data base 32. The pattern analyser 26 more particularly comprises a pattern analysing unit PA_U 34 communicating with the data model database 24, a pattern updating unit PU_U 36 communicating with the pattern database 28 and a pattern filtering unit PF_U 38 communicating with the filtered pattern database 32.

Figure 3:
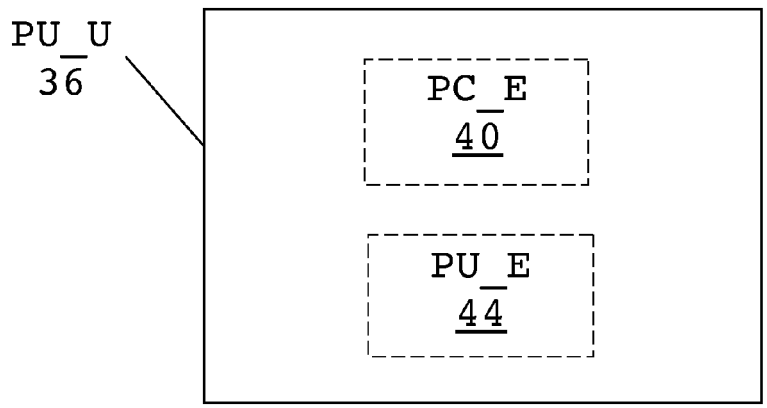
FIG. 3 shows a simplified block schematic of a pattern updating unit in the pattern analyser.

FIG. 3 shows a block schematic of she pattern updating unit 36. It includes a pattern collecting element PC_E 40 as well as a pattern updating element PU_E 44.

Figure 4:
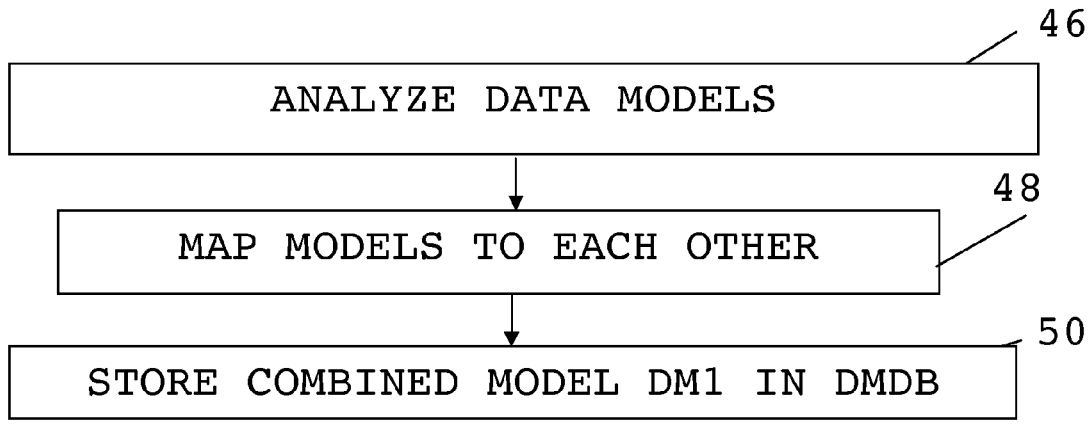
FIG. 4 shows a flow chart of method steps being performed in a data model analyser in the data collection system, FIG. 5 schematically shows a flow chart of method steps being performed in a pattern analysing unit, of the pattern analyser, FIG. 6 schematically shows a flow chart of method steps being performed in the pattern updating unit of the pattern analyser, FIG. 7 schematically shows a computer program product according to an embodiment of the invention in the form of a CD ROM disc with a computer program performing the functionality of the invention, and FIG. 8 schematically shows a computer which may implement a data pattern processing node.
Figure 5:
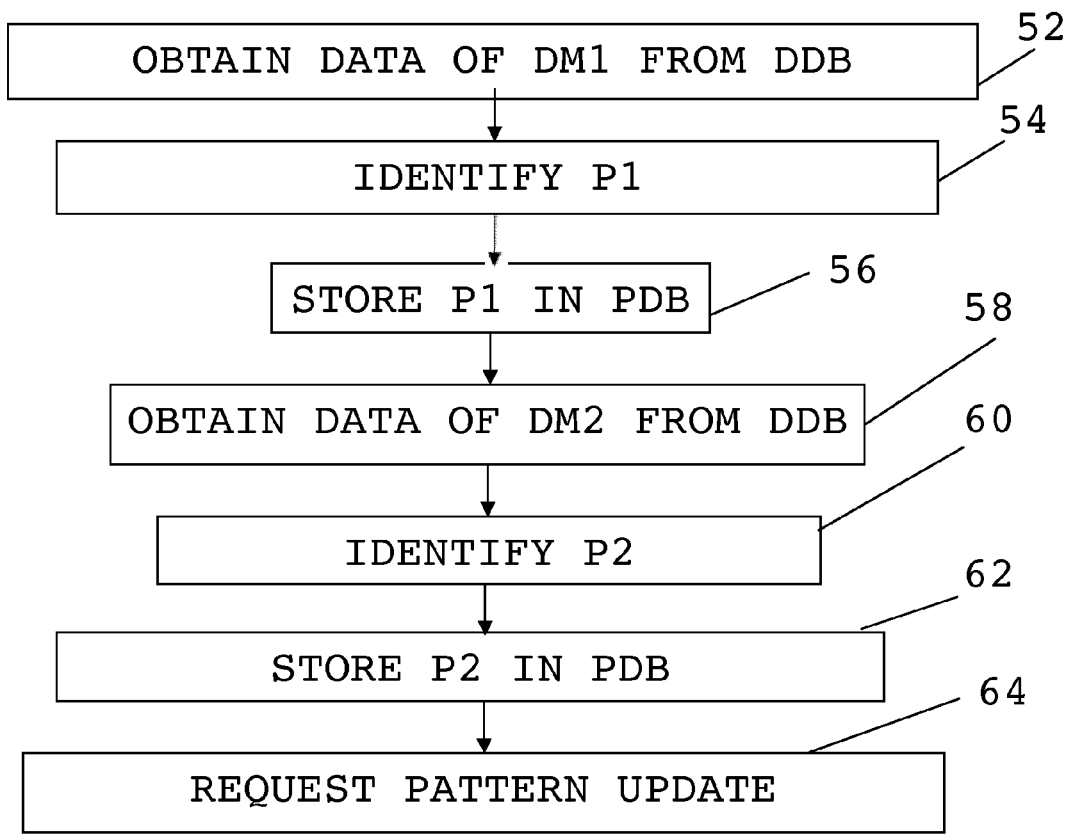
Figure 6:
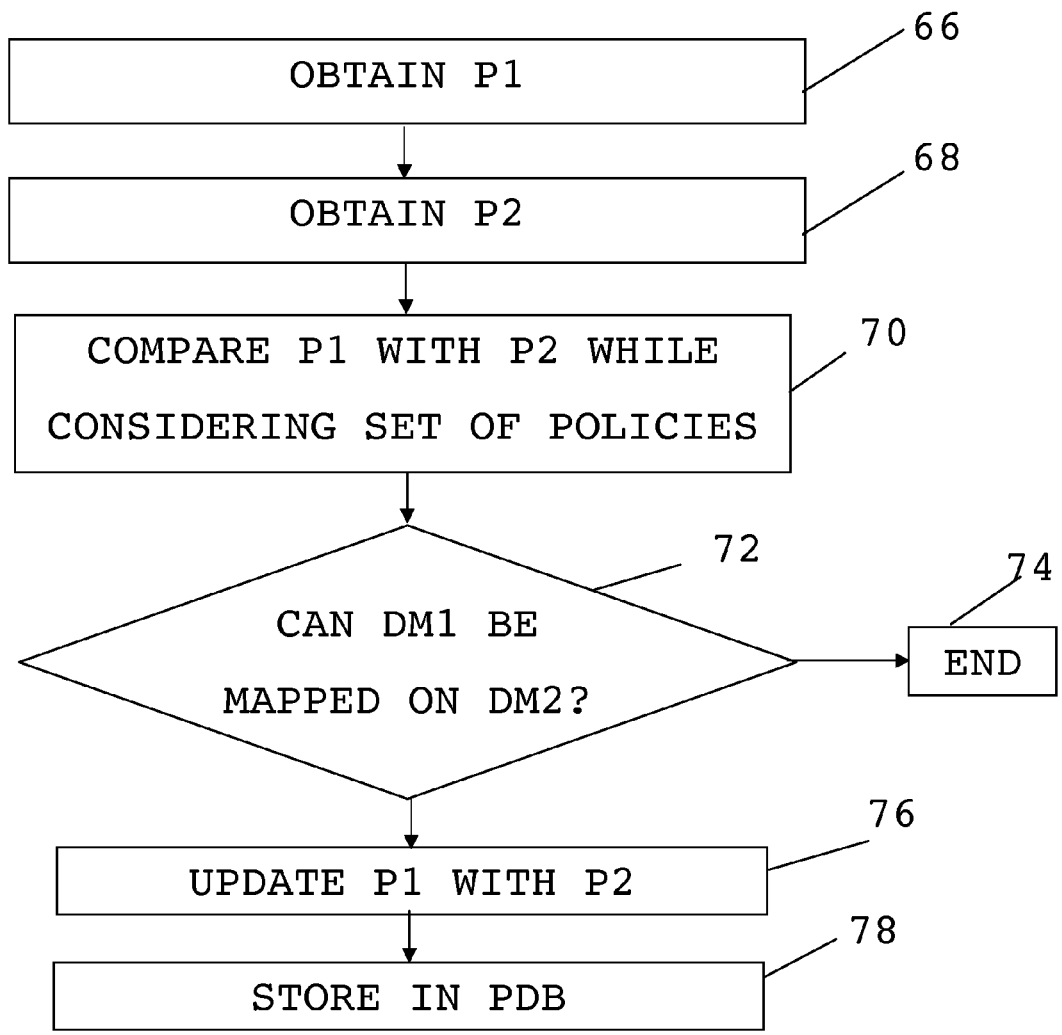

Now the functioning of the exemplifying first embodiment will be described in more detail with reference also being made to FIG. 1-3 as well as to FIGS. 4, 5 and 6, where FIG. 4 shows a flow chart of method steps being performed in the data model analyser, FIG. 5 schematically shows a flow chart of method steps being performed in the pattern analysing unit 34 of the pattern analyser 26 and FIG. 6 schematically shows a flow chart of method, steps being performed in the pattern updating unit 36 of the pattern analyser 26.

Data relating to various entities is collected from the network through a number of different sensors, where the base station 12 may be considered to be one such sensor. This is an implicit sensor. Other types of implicit sensors are positioning systems used. The invention can also be used with explicit sensors, such as temperature sensors, pressure sensors etc. The data is furthermore related to different entities, for instance users of the system 10 and in this example the users are users of user terminals, exemplified by the user terminal 11. Data is time stamped and may be stored locally in relation to the servers 14, 16 and 18, for instance in various log files of the servers.

This data should however be transferred to the data database 20. One way in which this may be done is through data mining of entity profiles on the servers 14, 16 and 18, since user terminal identities are uniquely identified by the user identity from a home subscriber server (HSS), and SIP messages are sessions tied, to the user identity. This makes it possible to collate all transactions which relate to a user identity, using it as key and mining these transactions from the log files of the servers. In particular in situations where there are users which remain with one single operator for a long time, it is likely that they will retain the same identity, which can then be used for entering data in the data database 20. In the present example this data mining is performed by the data collector 23 of the pattern analysing device 27. However, it should be realized that the data collector may be provided outside this device, for instance as a part of the data database 20. The functionality of the node 21 can as an alternative also be instantiated in a distributed fashion, over several of the nodes in the network. If communication with an HSS is needed then this is possible to perform using the Diameter protocol.

The Application Server 18 and other nodes which handle SIP messages, such as communication server 14 and 16, logs operations to log files. Each of these nodes is also equipped with a Session Initiation Protocol User Agent (SIP UA) as well as an element acting as a subscribe/notify agent. In the present example, the data collector 23 mines the log files which are part of the application server 18 and communication servers 14 and 16 to create the data database 20 of the transactions in the system 10. The data database 20 may receive the data from e.g. data mining activities, from data retention, and from direct retrieval from log files of the relevant servers over an interface such as the interface named the Sh interface.

The data database of mined log file information can be created in a batch operation, or it can be created as a continuous process, where updates to the log files are copied to the data database. Alternatively, it is possible to use the Subscribe/Notify function of the SIP protocol to receive notifications of changes to the various server databases.

In the latter case, this would work as follows.

A precondition is that normal IMS system setup has been conducted, i.e. authentication and authorization has been performed for all interacting parties. In addition, when the application server 18 was set up, the data collection device discovers it by mediation of the S-CSCF and sends a SIP Subscribe to a Subscribe/Notify Agent of the SIP UA in the application server 18. The application server 18 then receives a SIP message on the SIP UA and forwards it internally to an application logic, which applies logic to application data and the received message. The Application Logic then forwards the processed message to another Protocol Interface and stores a record of the action in a log file. As the log file changes, a log filter may monitor the changes and when a threshold is set, the log filter may trigger a notification in the Subscribe/Notify Agent. The Subscribe/Notify Agent then sends a notification to subscribing parties (i.e. the data collector 23) using the SIP UA.

The data collector 23 can thus make sure that the data is stored in the data database 20. When data is stored in this data database 20, it is stored according to one or more data models and associated with entities.

One example of a data model that is applicable for voice communication is related to a voice call. Data types in this voice call data model includes the types date, a-party, b-party and duration, where the a-party is a calling party of a call, the b-party is a called party of the call, duration is the duration of the call and date is the date of the call. Data according to this model, which is typically stored by S-CSCF in a log file can then be fetched and stored in the data database 20. It is here also possible that the time of the call is stored. If such a call is related to the user terminal 11, then the user terminal 11 is typically either the a-party or the b-party. As mentioned above, such data regarding the entities in the system is stored in the data database 20. This storing may as an alternative to being controlled by the data collector 23, be made by the various network servers 14, 16 and 18 by their own initiative. The storing of data according to entity may be done through linking the data to an identifier of the user terminal, such as an International Mobile Subscriber Identity (IMSI) or International Mobile Equipment Identity (IMEI). It should here be realised that there may exist several data bases, for instance one for each data model for which information about the communication pattern of an entity like the user terminal may be gathered.

In order to be able to make a determination of the behaviour of the entity, here the user terminal 11, the data of the various data models has to be analysed.

The data in the data database 20 can be regarded as a sequence of objects. The objects are thus structured in a sequence. In the sequence, the objects will appear in subsequences. These subsequences may be repeated, in which case they will make up patterns. The patterns can be translated into action sequences, which can be used predicatively as well as analytically. The pattern structures can also be analysed in metapatterns, which will imply e.g. the recurrence of a pattern, or its repetitiveness; or another parameter which can foe drawn out of the analysis. This is done through identifying patterns in the data. However, in order to identify these patterns, the data models have to be analysed.

The analysis of the data models is performed by the data model analyser 22. It retrieves data according to the various models from the data database 20 and analyses the data models, step 46. This analysing typically involves comparing the models to each other. This means that the data types of the models are analysed for finding correspondence to each other. The above described voice call data model may for instance be compared with a messaging data model, like an MMS data model. The data types of the models are then mapped to each other, step 48, i.e. the voice call date may be mapped to message date, the voice call a-party mapped to the message source, the voice call b-party mapped to the message destination and the voice call duration may be mapped to length of message. After this mapping has been performed, the mapping of the models is stored in the data model data base 24, step 50. The mapping may be stored as a combined data model DM1. It is then possible to determine patterns of the data in the data database 20 according to the combined or aggregate data model DM1 in the data model database 24.

At the same time the original data or measurements are tagged for enabling retrieval of only this original data if required.

Based on this data it is then possible to perform pattern analysis. Patterns in the data of the data models generated over time can thus be obtained or identified. Pattern analysis can here be performed using known methods such as machine learning algorithms. Examples on machine learning algorithms include Kernel based Principal Component Analysis (PCA) and Support Vector Machine (SVM). Patterns may be any kind of combinations of occurrences in the data, as long as they are regular and recurring.

The pattern analysing unit 34 of the pattern analyser 26 can then obtain data of a data model, for instance the combined or aggregate data model DM1 described above, and from the data database 20, step 52, and identify a pattern P1 in it, step 54, which pattern P1 is identified through for instance analysing a test sequence of the data and applying one of the above mentioned algorithms. The pattern P1 is then stored in the pattern database 28, step 56.

In this way a pattern of the models may be stored in the pattern database 28, where a pattern may be based on one or more of the data models. One example of such a pattern is exemplified in the table below for the user of the user terminal 11.

| U_ID | MMS/day | Voice calls/day | ... | Fast rate | Label |
|---|---|---|---|---|---|
| UT | 4 | 5 | | 1 | X |

In this example the user of the user terminal UT 11 is found to have a pattern of sending 4 MMS messages per day, to make 5 voice calls per day and to setup 1 fast rate connection. The user is here also rated or labelled according to the pattern with a label X, which label may indicate a heavy mobile user.

The pattern may here be provided in the form of a vector A with attributes presenting entity related information $A=(a_1, a_2, \ldots a_n)$, were $a_1$ may correspond to MMS/day, $a_2$ to Voice calls per day and $a_n$ to fast rate connections per day in line with the example given above. The pattern P1 thus comprises a number of attributes.

Now it is possible that a new service is provided in the system, for instance by the application server 18. This may be done if for instance the application server 18 is a new service node being introduced in the system 10. When a new service, instantiated in an application server is installed, this server communicates with the nodes in the network, including node 21, and other nodes over the previously mentioned Sh interface. Since a new service is likely to create a different set of interactions than previously implemented services, it would, be beneficial if the pattern database and/or the data database could be searched for the patterns which are relevant to the new service, and these could be retrieved, and for instance used in optimizing the new application server for the service environment at hand.

This new service may cause a further data model to be created in addition to the existing data models of historic data, such as the combined data model DM1. As an alternative it may not cause any further data model to be created but a pattern change. Other reasons for a change in pattern can be the introduction of new measurement methods. Such changes therefore lead to the patterns changing, if not in substance then in richness, and this can both be derived and recursively derived from the component combinations of existing patterns like the pattern P1. The new service may thus change both the data model and the patterns, either because new measurements become apparent, or because the new service itself changes the behaviour of the entity. It may, however, also change only either; in particular, it may only change the patterns, if the data model will remain constant, even with new service introduced.

According to the invention a further pattern and/or a further data model caused by the new service are of interest to apply also in relation to the existing patterns and existing data models. The pattern analysing unit 34 of the pattern analyser 26 may therefore here obtain newer data of the system after the introduction of the new service, which may thus be data of a further model DM2, step 58. This data is then analysed for identifying a further pattern P2, step 60, which pattern can be identified through an analysis of the data according to the existing model DM1 or if there is a further data model DM2 through combining the data of the further data model with the existing pattern P1. This may be done through applying a classifying algorithm such as Bayes classifier (supervised learning) on the data of the further data model DM2 while applying the existing pattern P1. It is a also possible to perform a new analysis of all the data generated after the introduction of the new data model, i.e. of both the further and the existing data model and identify a further pattern P2 based on the analysis. In all three cases a further pattern P2 is identified, step 60. This further pattern P2 is then stored in the pattern database 28 by the pattern updating unit 36, step 62. As a further pattern has been identified, the pattern analysing unit 34 furthermore sends a request for a pattern update to the pattern analysing unit 34, step 64. The further pattern P2 is here also a vector B in the form described above. It may thus have a form B=($b_1$, $b_2$, . . . , $b_n$) in the same way as the existing pattern P1.

The pattern updating unit 36 here receives this request for pattern update and then investigates if a pattern update is to be performed or not. In order to do this, the pattern collecting element 40 of the pattern updating unit 36 obtains the existing pattern P1 from the pattern database 28, step 66, and then obtains the further pattern P2 from the pattern data base 28, step 68. The obtaining is here performed through collecting the patterns from the pattern database 28, i.e. through the pattern collecting element 40 fetching the patterns from the pattern database 28. However, it is as an alternative possible that a pattern is sent to the pattern collecting element 40. The pattern collecting element 40 may thus receive a pattern, for instance from the pattern analysing unit 34. After the pattern collecting element 40 has collected the patterns P1 and P2, the pattern updating element 44 then investigates if an update is to be performed. This is done through comparing the patterns with each other while considering a set of polices, step 70. The comparison may furthermore involve comparing attributes with each other, where each attribute corresponds to data of a data model.

This comparison can foe performed by determining the distance between the two vectors.

If the patterns having the above mentioned attributes, the distance, also termed Euclidian distance, can be determined according to:

$$d(A,B)=\sqrt{(a_1-b_1)^2+(a_2-b_2)^2+...(a_n-b_n)^2}$$

The pattern updating element 44 then investigates if the first data model DM1 can be mapped on the second data model DM2, step 72, and if it cannot, the processing is ended, step 74. This means that no pattern update is made. However, if the first data model DM1 can be mapped on the second data model DM2, step 72, the existing pattern P1 is updated with the further pattern P2, step 76.

The investigation can here involve investigating if the difference is significant, which may involve comparing the above mentioned distance with a threshold, and if the distance is below the threshold, then the patterns are similar enough for not needing to update the first pattern P1 with the second pattern P2.

This means that if the distance is insignificant, for instance less than $0.5*10^{-3}$, then the pattern updating element 44 does not need to update the first pattern P1 in the pattern database 28. Otherwise it instructs the data model analysing device 22 to update the existing data model DM2 with the new data types of the further pattern and to store the updated existing data model DM1 in the data model database 24. The pattern updating element 44 then updates the existing pattern P1 with the new attributes of the further pattern P2. This may be done through adding the attributes of the further pattern to the existing pattern. The updated existing pattern is then stored in the pattern data base 28, step 78. An update of a pattern may here also involve a change of the label of the pattern. Both the first pattern P1 and the first data model DM1 will, thus be updated. When an updated pattern has been computed, the pattern database 28 is updated recursively. This can be done as a replacement operator, or, if this is possible, the database is copied and recursively updated.

That the distance is significant can also be determined as follows. The distance may be compared with a set of policies, which have been created by a user or provisioned in the pattern updating element 44 (e.g. from, start, when it was manufactured).

Policies are rules of the type "if-then" which determine what actions are needed for the data to be determined to be significant. Policies can be absolute, i.e. a policy can represent a value ("if the reading is larger than 5 then trigger an event"). Policies can also be aggregative, i.e. aggregate polices according to at least one attribute, and associated with thresholds, i.e. "if the readings from the past two days when summed up and divided with the current time equals 5, then trigger an event".

Policies can also be used to analyse metapatterns, where a metapattern is a pattern of the pattern, and these metapatterns can determine how a pattern can be updated. For instance, patterns which by the analysis of metapatterns frequently occur near each other can be inserted. As an example, if a pattern ACATTAG often occurs within an interval, of seven objects from a pattern GATTACA, the pattern database 28 can be updated by inserting this pattern ACATTAG whenever the GATTACA pattern occurs. The pattern updating element 44 would then be provisioned with a policy to this effect, and execute it when applied to the data. This may here involve the pattern updating element comparing the occurrence of the further pattern in relation to the occurrence of the first pattern in the newer data according to the further data model and updating the first pattern with the further pattern with the same relationship as in the newer data.

This means that if the conditions are fulfilled, the existing pattern. P1 is updated with the further pattern P2, step 76, which means that the existing pattern, which reflected the situation before the new service was introduced is made to consider also the data of the further data model DM2 in which the further pattern P2 is provided. In this way the existing pattern P1 is enriched.

The existing pattern P1 can here also be pruned by a data discarder provided in the pattern analysing device. The pruning involves removal or discarding of less relevant data. This pruning may be provided through applying the pattern analysis also for data discarding. In other words, as new patterns are derived, they are combined with the data models to determine which data are most likely to result in new patterns, and pattern updates. This is then applied to pruning of the database for the data which is less likely to lead to the new or enriched patterns. Data that is less likely to lead to an updated pattern is thus removed. Even so, a certain amount of data points should be kept, and the pruning algorithm should be stored, which implies that data can be reconstructed by reversing the algorithm. Machine learning techniques can be applied to automate the pattern analysis for this purpose using pattern mining algorithms such as the APRTORI Algorithm or other association rules. Such pruning may thus involve determining the probability of data resulting in new patterns based on the further pattern and the data models, comparing the probabilities with a probability threshold and discarding data for which the probability falls below the threshold.

In order for the patterns to be used in providing user profiles, the pattern filtering unit 38 then selects which patterns are to be given out and to whom. This unit 38 can the provide patterns to the filtered pattern database 32 in relation to entity based on requests from a requester, where a requester can for instance be the operator of the system or a service provider in the system. The filtered pattern database 32 can be multi-instantiated, i.e. provide one instance per requester.

The invention thus provides a system and method for how to recursively include patterns in a profile of an entity, as the patterns become richer due to the measurements being richer. In this way it is possible to use also existing data in combination with new data for obtaining of profiles, which may speed up the determining of a profile. A reliable profile can thus be obtained fast. There is also a more efficient use of data models as well as patterns.

The pattern analysing device can be implemented in a number of ways. It is possible that the data collector, data model analyser, data discarder and pattern analyser are provided in the form of hardware. However, it is also possible that they are provided in the form of software. As mentioned above, they and their elements and units may with advantage be provided in the form of one or more processors with associated program memory including computer program code for performing their functions. However this computer program code can be provided via a computer program, for instance a program on an external server, and then downloaded to the computer which is to act as a pattern analysing device.

Figure 7:
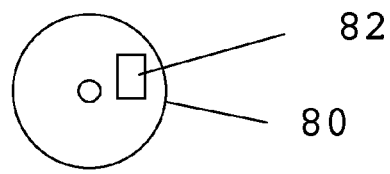

The computer program code may also be provided on a computer readable means, for instance a computer readable means in the form of a data carrier, like a CD ROM disc, a flash memory, an EEPROM memory or a memory stick carrying such a computer program, with the computer program code, which will implement the function of the pattern analysing device when being loaded into a computer. The invention may thus be provided as a computer program product comprising a computer readable means carrying a program with computer program code. One such computer program product comprising a computer readable means in the form of a CD ROM disc 80 with the above-mentioned computer program 82 is schematically shown in FIG. 7.

There are a number of variations that may be made of the invention. It is possible to include one or more of the data database the pattern database and the filtered pattern, database in the pattern analysing device. It is also, as mentioned earlier possible to omit the data collector. It is furthermore possible to also omit the data model analyser and data discarder. It should be realized that patterns can be identified and stored by a separate data model analyser. A pattern analysing device only including a pattern analyser can then be made to analyse and update patterns according to the above described principles and user profiles can then be made only based on such patterns. It should furthermore be realized that, pattern filtering unit may be omitted and that a party interested in patterns may directly access the pattern database.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for changing a pattern in data according to at least one data model in a communication system comprising hardware, said data comprising collected data of activities of user terminals communicating with the communication system using a network interface and said data of activities being grouped in a data base according to user terminal, the method being performed in a pattern processing node of the communication system and comprising the steps of:
   obtaining an existing pattern of historical data according to at least one existing data model, said existing pattern relating to said user terminal associated with the communication system,
   obtaining a further pattern of newer data according to a further data model, said further pattern also relating to said user terminal, wherein the historical data is generated before the existing pattern is identified and the newer data is generated after the historical data,
   comparing the existing pattern with the further pattern,
   determining if the existing data model can be mapped on the further data model based on the comparison,
   determining a Euclidean distance between a vector of the existing pattern and a vector of the further pattern;
   when the Euclidean distance between the vector of the existing pattern and the vector of the further pattern is above a distance threshold, updating the existing pattern with the further pattern in relation to the historical data based on determining that the existing data model can be mapped on the further data model, wherein the updated existing pattern is stored in the database; and
   when the Euclidean distance is not above the distance threshold, the existing pattern is not updated.

2. The method according to claim 1, wherein each pattern comprises a number of attributes, the step of comparing patterns comprises comparing attributes of the patterns with each other, where each attribute corresponds to data of a data model and the step of updating comprises adding attributes of the further pattern to the existing pattern.

3. The method according to claim 2, wherein each pattern is provided as a vector and the step of comparing comprises determining the Euclidean distance between the vectors and the step of determining if the existing data model can be mapped on the further data model comprises comparing the Euclidean distance with the distance threshold.

4. The method according to claim 1, wherein the step of comparing is made while considering a set of policies.

5. The method according to claim 4, wherein the set of policies comprises an absolute policy regarding at least one attribute.

6. The method according to claim 4, wherein the set of policies comprises an aggregate policy regarding at least one attribute.

7. The method according to claim 1, wherein the step of comparing the existing pattern with the further pattern comprises comparing the occurrence of the further pattern in relation to the occurrence of the existing pattern in the newer data according to the further data model and the step of updating comprises updating the existing pattern with the further pattern with the same relationship as in the newer data.

8. The method according to claim 1, further comprising the step of identifying the further pattern based on at least some newer data.

9. The method according to claim 1, wherein the existing pattern has a label and further comprising the step of changing the label based on the updated pattern.

10. A communication system comprising a pattern analysing device in a pattern processing node and a database having data comprising collected data of activities of user terminals communicating with the communication system using a network interface and said data of activities being grouped according to user terminal, the pattern analysing device comprising:
a pattern updating unit equipped with a pattern collecting element configured to:
obtain an existing pattern of historical data according to at least one existing data model, said existing pattern relating to a user terminal associated with the communication system, and
obtain a further pattern of newer data according to a further data model, said further pattern also relating to said user terminal, wherein the historical data is generated before the existing pattern is identified and the newer data is generated after the historical data, compare the existing pattern with the further pattern, and a pattern updating element configured to determine if the existing data model can be mapped on the further data model based on the comparison, and
determine a Euclidean distance between a vector of the existing pattern and a vector of the further pattern;
when the Euclidean distance between the vector of the existing pattern and the vector of the further pattern is above a distance threshold, update the existing pattern with the further pattern in relation to the historical data based on determining that the existing data model can be mapped on the further data model, wherein the updated existing pattern is stored in the database, and
when the Euclidean distance is not above the distance threshold, the existing pattern is not updated.

11. A communication system according to claim 10, wherein the pattern analysing device further comprises a pattern analysing unit configured to identify at least the further pattern based on at least some of the newer data.

12. The method of claim 1, wherein the existing pattern is maintained in a pattern database, the method further comprising:
responsive to updating the existing pattern, recursively updating the pattern database.

13. The method of claim 1, wherein the Euclidean distance is determined according to:

$$d(A,B)=\sqrt{(a_1-b_1)^2+(a_2-b_2)^2+...(a_n-b_n)^2}$$

where d represents the Euclidean distance, A represents the vector of the existing pattern, and B represents the vector of the further pattern.

14. The communication system of claim 10, wherein the existing pattern is maintained in a pattern database, the a pattern updating unit equipped with a pattern collecting element further configured to:
responsive to updating the existing pattern, recursively update the pattern database. updating the existing pattern.

15. The communication system of claim 10, wherein the Euclidean distance is determined according to:

$$d(A,B)=\sqrt{(a_1-b_1)^2+(a_2-b_2)^2+...(a_n-b_n)^2}$$

where d represents the Euclidean distance, A represents the vector of the existing pattern, and B represents the vector of the further pattern.

* * * * *